(12) United States Patent
Chan et al.

(10) Patent No.: US 9,525,504 B2
(45) Date of Patent: Dec. 20, 2016

(54) APPARATUSES, SYSTEMS, METHODS, AND COMPUTER PROGRAM PRODUCTS FOR ADD-DROP MULTIPLEXING

(71) Applicant: TELLABS OPERATIONS, INC., Naperville, IL (US)

(72) Inventors: Eric L. Chan, Naperville, IL (US); Bradley R. Kangas, St. Charles, IL (US); Peigang Hu, Shanghai (CN)

(73) Assignee: CORIANT OPERATIONS, INC., Naperville, IL (US)

( * ) Notice: Subject to any disclaimer, the term of this patent is extended or adjusted under 35 U.S.C. 154(b) by 103 days.

(21) Appl. No.: 14/457,765

(22) Filed: Aug. 12, 2014

(65) Prior Publication Data

US 2016/0050043 A1   Feb. 18, 2016

(51) Int. Cl.
*H04J 14/02* (2006.01)
*H04Q 11/00* (2006.01)

(52) U.S. Cl.
CPC .......... *H04J 14/0205* (2013.01); *H04J 14/021* (2013.01); *H04J 14/0206* (2013.01); *H04J 14/0286* (2013.01); *H04J 14/0287* (2013.01); *H04Q 11/0067* (2013.01); *H04Q 2011/0081* (2013.01)

(58) Field of Classification Search
CPC .... H04J 14/02; H04J 14/0201; H04J 14/0204; H04J 14/0212; H04J 14/0205; H04J 14/0286; H04Q 11/0005
USPC ........ 398/83, 79, 45, 48, 49, 50, 51, 53, 56, 57,398/82, 59, 3, 5, 2, 4, 7, 8; 385/24, 37, 16, 17, 385/18
See application file for complete search history.

(56) References Cited

U.S. PATENT DOCUMENTS

| | | | |
|---|---|---|---|
| 6,233,221 B1 | 5/2001 | Lowe | 370/222 |
| 2003/0185566 A1* | 10/2003 | Nishi | H04J 14/0291 398/56 |
| 2004/0114925 A1* | 6/2004 | Berthold | H04B 10/2503 398/45 |

OTHER PUBLICATIONS

Sosnosky J. et al., "Sonet Ring Applications for Survivable Fiber Loop Networks", IEEE Communications Magazine, vol. 29, No. 6, Jun. 1, 1991, pp. 51-58, XP000235725.
Roland J. et al., "Application of Dual-Access Architecture, With Drop and Continue Feature, to WDM Optical Networks", Technology and Infrastructure, Jun. 23, 1998, pp. 259-266, XP002161771.
Shafai, "Technical Feasibility of 100G. Designs", IEEE Draft; vol. 802.3, Apr. 20, 2007, pp. 1-11, XP017630591.

* cited by examiner

*Primary Examiner* — Hanh Phan
(74) *Attorney, Agent, or Firm* — Fitzpatrick, Cella, Harper & Scinto

(57) ABSTRACT

A network element includes first and second multiplexers, first and second interfaces, and first and second selecting units. The multiplexers are communicatively coupled. The first interface is communicatively coupled to the first multiplexer and configured to receive multiplexed signals. The second interface is communicatively coupled to the second multiplexer and configured to receive multiplexed signals. The first selecting unit is communicatively coupled to the first and second multiplexers and configured to select between a signal received from the first multiplexer and a signal received from the second multiplexer. The second selecting unit is also communicatively coupled to the first and second multiplexers and configured to select between a signal received from the first multiplexer and a signal received from the second multiplexer.

21 Claims, 6 Drawing Sheets

APPARATUSES, SYSTEMS, METHODS, AND COMPUTER PROGRAM PRODUCTS FOR ADD-DROP MULTIPLEXING

BACKGROUND

Field

Example aspects described herein relate generally to routing data on a network, and, more specifically, to add-drop multiplexing at network nodes.

Related Art

Optical networks, such as active optical networks (AON), passive optical networks (PON), and combinations thereof, contain various network elements that are capable of sending and transmitting data, thereby allowing for communications on the network (such communications are referred to herein as "network traffic"). Network elements on an optical network can include components such as, for example, switch nodes, edge nodes, transport systems, network managers, and optical network terminals. These network elements can be communicatively coupled to (and thus capable of sending network traffic to) each other, such that each network element is coupled to at least one other network element.

Network traffic can be distributed among the network elements using various topologies. One topology for provisioning network elements and network traffic is a ring network. There are known ways for arranging a ring network. Typically, a ring network includes main hubs for network traffic—referred to as "nodes"—connected by optical fiber "links" or "legs." Each node is communicatively coupled, via one or more ports of the node that connect to links, to two other nodes, thus forming a ring of nodes.

A ring network can be provisioned such that duplicate network traffic is transmitted, one in each direction of the ring. The redundancy provided by multiple traffic paths around the ring network permits other nodes in the ring to remain connected (and thus able to continue transmitting network traffic to others node in the ring) in the event there are node or link failures.

Nodes in a ring can be configured to permit "ingress" and "egress" traffic. Ingress traffic is communications received from a source outside of the ring network that are added to the ring traffic; egress traffic is communications removed from the ring traffic that is sent to a destination outside of the ring network. Sources of ingress traffic (and destinations for egress traffic) include other networks (e.g., other rings), local intranets, and internet service providers (ISPs). Collectively, these sources are referred to herein as "clients," and ingressing and egressing traffic at a node is referred to herein as "client traffic."

Rings (and the network traffic transmitted thereon) can employ Synchronous Optical Networking (SONET) and/or Synchronous Digital Hierarchy (SDH) architectures and can be provisioned to incorporate one or more networking standards (e.g. IEEE standards, such as 40 Gigabit Ethernet (40 G) and 100 Gigabit Ethernet (100 G), and International Telecommunications Union Telecommunication Standardization Sector (ITU-T) Recommendation G.709, titled "Interfaces for the optical transport network"), some of which require or otherwise use multiplexed (e.g., wavelength-division multiplexed) signals. For example, a 100 G network may contain 88 channels, each supporting 100 G communications using different wavelengths. So that client traffic (which itself may or may not be multiplexed) can ingress to and egress from individual channels of multiplexed ring traffic, ring nodes can include one or more add-drop multiplexers (ADM).

For example, a ring node may have two ADM components, or "blades," one for each ring traffic direction (e.g., one blade for each communicative coupling to another ring node). Each ADM receives ring traffic that enters a node port and opposite-direction ring traffic outgoing through that port. For example, incoming east ring traffic is demultiplexed by the ADM so that ingress traffic can be added and egress traffic removed before being multiplexed by the other ADM. Conversely, outgoing west ring traffic (which has first been demultiplexed by the other ADM and had ingress traffic added and egress traffic removed) is multiplexed by the ADM for transmission on the ring.

The ADMs at a node can be connected by a high-speed interconnection. Demultiplexed ring traffic is sent from the demultiplexing ADM via the interconnection to the other ADM, for re-multiplexing and transmission out of the port to which that other ADM is connected. Depending on the configuration of the node and its components, ingress/egress traffic can be handled at either ADM or at one or more separate components.

The bandwidth of ADMs, including the speed of the interconnection, can be a constraint that affects network speed and reliability. For example, on a 100 G ring network, a node must be able to handle the incoming and outgoing ring traffic at 100 Gb/s. Accordingly, to minimize bottlenecking, the ADMs and their interconnection(s) must support 100 G processes. Moreover, the node must further handle the client traffic, which may reach 40 G or 100 G speeds. Thus, a single 100 G interconnection between ADMs can limit the bandwidth of the node.

Upgrading a node to include additional ADM interconnections, however, may not be possible due to hardware and/or software limitations of the node and/or its components, and in any case can be expensive to implement. Moreover, even if a node is fully capable of handling all client and ring traffic without a loss of network speed, the reliability of the network still may be affected if there is not a redundant source for client traffic. For example, if client traffic is received at a node over a single fiber, any failure along that fiber can reduce or eliminate the ability of the node to handle ingress/egress traffic.

SUMMARY

The above and other limitations can be overcome by network elements, systems, and non-transitory computer-readable storage media described herein.

According to one aspect, a network element includes a first multiplexer communicatively coupled to a second multiplexer, a first interface communicatively coupled to the first multiplexer and configured to receive multiplexed signals, a second interface communicatively coupled to the second multiplexer and configured to receive multiplexed signals, a first selecting unit communicatively coupled to the first and second multiplexers and configured to select between a signal received from the first multiplexer and a signal received from the second multiplexer, and a second selecting unit communicatively coupled to the first and second multiplexers and configured to select between a signal received from the first multiplexer and a signal received from the second multiplexer.

According to another aspect, a network element includes at least two interfaces, at least two other interfaces, and at least two selecting units. The network element is configured to receive first network communications at one of the at least two interfaces and second network communications at another of the at least two interfaces. The network element is further configured to demultiplex the first network communications and the second network communications. The network element is further configured to transmit the demultiplexed first network communications and the demultiplexed second network communications to the at least two selecting units. The network element is further configured to, at each of the at least two selecting units, select one of the demultiplexed first network communications and the demultiplexed second network communications. The network element is further configured to transmit the demultiplexed network communications selected by each of the at least two selecting units to a separate one of the at least two other interfaces.

According to still another aspect, a method for processing communications on a network includes receiving first multiplexed network communications at a first interface, receiving second multiplexed network communications at a second interface, demultiplexing the first multiplexed network communications to obtain first demultiplexed data, demultiplexing the second multiplexed network communications to obtain second demultiplexed data, selecting one of the first and second demultiplexed data at a first selecting unit, selecting one of the first and second demultiplexed data at a second selecting unit, transmitting the demultiplexed data selected by the first selecting unit to a third interface, and transmitting the demultiplexed data selected by the second selecting unit to a fourth interface.

According to yet another aspect, a non-transitory computer-readable storage medium contains a computer program having instructions which, when executed by a computer, cause the computer to carry out a method for processing communications on a network. The method includes demultiplexing first multiplexed network communications to obtain first demultiplexed data, demultiplexing second multiplexed network communications to obtain second demultiplexed data, selecting one of the first and second demultiplexed data by a first selecting unit, selecting one of the first and second demultiplexed data by a second selecting unit, transmitting the demultiplexed data selected by the first selecting unit, and transmitting the demultiplexed data selected by the second selecting unit.

BRIEF DESCRIPTION OF THE DRAWINGS

The features and advantages of the example embodiments presented herein will become more apparent from the detailed description set forth below when taken in conjunction with the drawings. Like reference numbers between two or more drawings can denote identical or functionally similar elements unless the description indicates otherwise.

DETAILED DESCRIPTION

Figure 1:
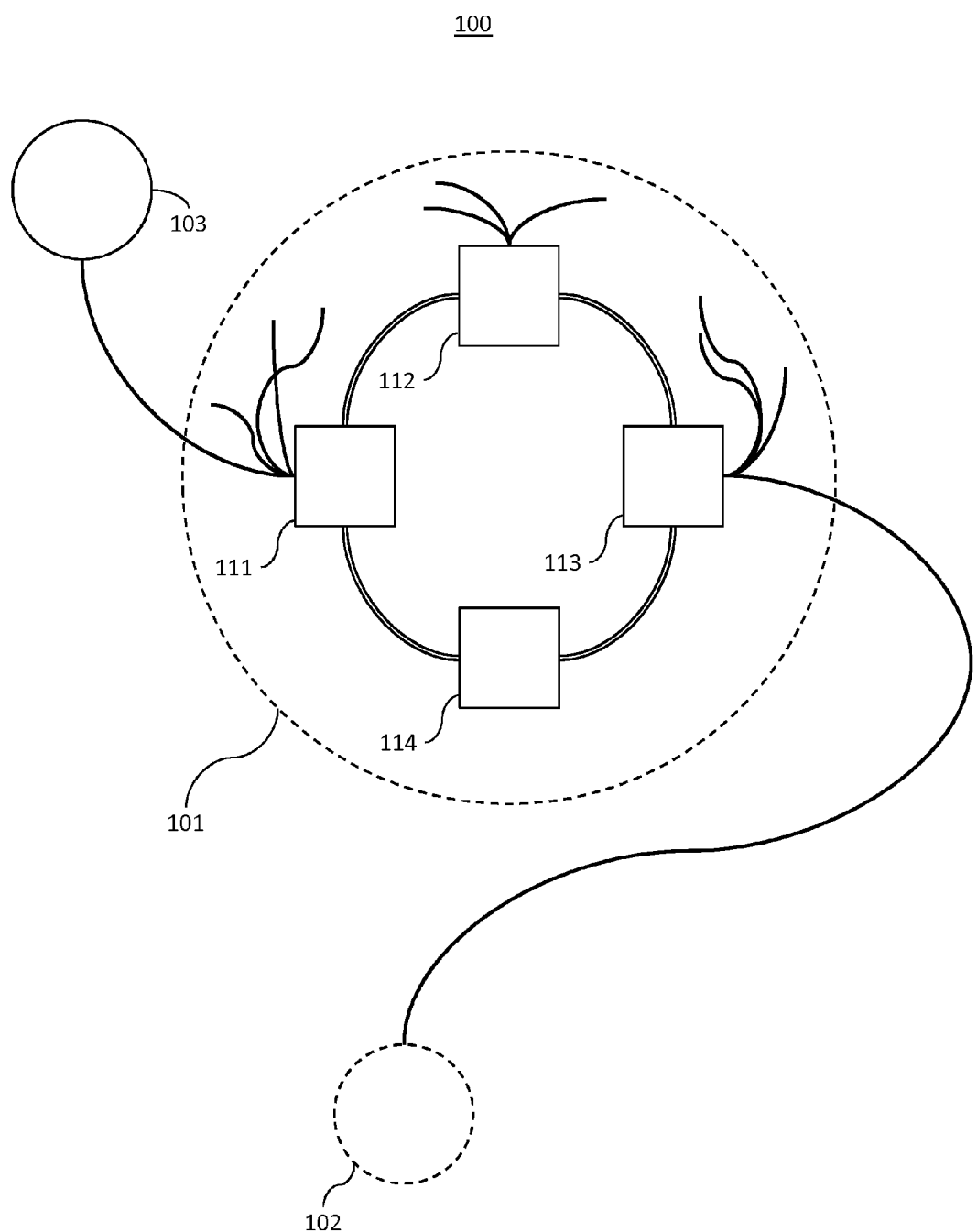
FIG. 1 shows an example optical network.

FIG. 1 shows an example optical network within which example embodiments herein may be configured and/or deployed. Optical network 100 can be, for example, an optical transport network (OTN) that carries SONET/SDH signals and/or other signal types (e.g., Ethernet signals). Optical network 100 may be a subnetwork (or "subnet") of a larger network (not shown).

Optical network 100 includes ring networks 101 and 102 (ring networks may be referred to as simply "rings") and internet service provider (ISP) 103, which are communicatively connected to each other. The physical connections on which network traffic travels between locations in network 100 are optical fibers. Rings 101 and 102 and ISP 103 can be connected by main optical fibers that are typically referred to as "pipes."

Ring 101 includes nodes 111, 112, 113, and 114. The nodes of ring 101 may be any suitable type of node (e.g., add-drop multiplexer (ADM), optical cross-connect (OXC), switch, or edge), depending on the configuration of ring 101 and/or the node's location within the ring. The nodes of ring 101 are communicatively coupled to each other, as illustrated by double lines which denote that network traffic can travel between nodes in two directions.

Ring 101 also includes local client sources which are connected to individual nodes 111, 112, and 113. Additional client connections are illustrated in FIG. 1 by the three open-ended lines connecting to each of these nodes. A configuration of three (node 112) or four (nodes 111 and 113) local clients per node is simply an example of how local clients can be connected to nodes, and in practice, a node in a ring can have any number of local clients (including zero) connected to it.

Within the rings of network 100, network traffic between the nodes can travel in two directions. This bi-directional configuration can provide redundancy to network traffic within the ring, and is illustrated within ring 101 by the double lines connecting nodes 111, 112, 113, and 114. Network traffic in the ring includes egress traffic leaving the ring and ingress traffic entering the ring. From the perspective of node 101, ingress traffic can include communications from ring 102, ISP 103, or any of the local clients connected to the nodes in ring 101.

Network 100 may be configured such that communications between rings 101 and 102 and ISP 103 are redundant. In such a configuration, network traffic between rings 101 and 102 and ISP 103 can travel on one or more pipes that provide one or more communications pathways between rings 101 and 102 and ISP 103.

Each node in ring 101 includes one or more network elements which, in turn, can include, for example, one or more of the following components: an optical transport system (OTS), an optical transmitter, an optical line amplifier (OLA), an add-drop multiplexer (ADM), an optical hub, an optical switch, a router, a network management system, an element management system, a network planning system, and/or a network terminal. As used herein, the term "node" includes any network element(s) of the node and/or any components of such network element(s).

Rings 101 and 102 are simply examples of ring network configurations. For example, relative to the rings shown in FIG. 1, a ring can be have more or less nodes, there may be additional connections between nodes, and/or there may be additional components within or connected to the nodes (e.g., one or more network elements, nodes, networks and/or sub-networks). Rings configured in any of these (and other) ways may be suitable rings in which example embodiments herein may be used and/or configured.

In example embodiments herein, rings 101 (and/or ring 102) are configured for multiple 100G communications. For example, network traffic travelling within the rings can include dense wavelength division multiplexing (DWDM) signals consisting of multiple optical channel transport unit (OTU) signals (e.g., OTU4) that support 100 G network communications. Accordingly, each node in rings 101 and 102 can include one or more interfaces configured in accordance with ITU-T Recommendation G.709. For example, components of nodes 111, 112, 113, and 114 (e.g., ADMs) can be connected to one or more OTU interfaces.

In example embodiments herein, each of nodes 111, 112, 113, and 114 include an optical transport system at least two add-drop multiplexers (ADMs) configured to perform add-drop multiplexing processes such as, for example, reconfigurable ADM. The ADMs can include additional hardware and/or software that perform additional processes. Moreover, each ADM can be configured to perform other functions (e.g., packet switching, optical transport network (OTN) multiplexing, and OTN switching). Thus, as used herein, the terms "multiplexer" and "ADM" include any component that includes (or can be configured to have) add-drop multiplexing capabilities.

Network Element Configurations

Example aspects relate to network elements configured to reliably transmit and receive ring traffic and/or client traffic. Such configurations, which are generally referred to herein as "protected," include a network element that can select from at least two sources of egress traffic demultiplexed from ring traffic, for transmission of that traffic to another network element. In this configuration, for example, if a network failure causes one source of egress traffic to not function or otherwise fail to provide communications, the network element can select another source of egress traffic. Protected configurations further include a network element that receives ingress traffic from at least two sources, for multiplexing and transmitting onto a ring network in different directions. In this configuration, for example, if a network failure causes one source of ingress traffic to not function or otherwise fail to provide communications, while the network element cannot multiplex ingress traffic from that source onto ring traffic in one direction (e.g., east), the network element nevertheless can multiplex ingress traffic from another source onto ring traffic in another direction (e.g., west).

Those having skill in the art will recognize that although ring networks can include network elements having protected configurations, it is not required that each network element on a ring protect ingress/egress traffic.

Figure 2:
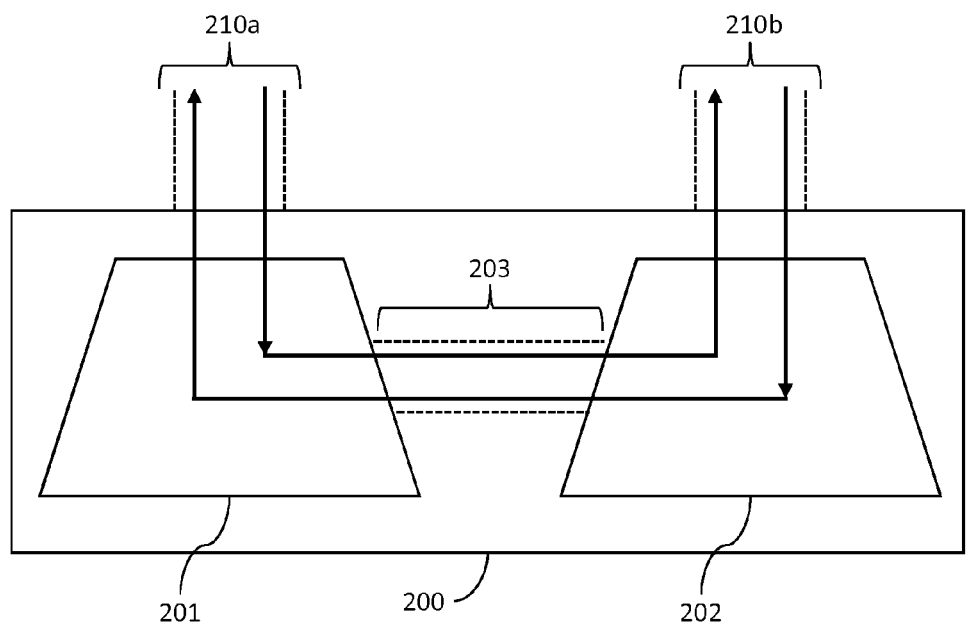
FIG. 2 shows a network element having a pass-through configuration.

FIG. 2 shows a network element 200 having a "pass-through" configuration. Generally, this configuration passes all ring network traffic (in each direction) through the network element. A network element configured as shown in FIG. 2 may be usable as a network element in (or forming a part of) a node in a ring network. In an example embodiment herein, network element 200 is an optical transport system.

Network element 200 includes multiplexers 201 and 202, and further includes interfaces 210*a* and 210*b* (each of which may be, for example, OTU interfaces) to which multiplexers 201 and 202, respectively, are connected. In an example embodiment herein, interfaces 210*a* and 210*b* are 100 G interfaces (e.g., C form-factor pluggable (CFP) interfaces) through which OTU4 signals can be transmitted and received. As used herein, an "interface" of a network element can include one or more physical interfaces through which one or more network sources can communicatively connect to the network element. Thus, for example, interface 210*a* may in practice include one or more physical interfaces.

Interfaces 210*a* and 210*b* can be configured to connect network element 200 to other network elements in a ring (e.g., ring 101 or 102 of FIG. 1). Through interfaces 210*a* and 210*b*, network element 200 can send multiplexed network traffic, including 100 G traffic, to other network elements and/or nodes within the ring. This capability is illustrated in FIG. 2 by the inbound (toward the network element) and outbound (from the network element) arrows passing through each interface.

In an example embodiment herein, interfaces 210*a* and 210*b* are configured to receive and transmit multiplexed optical network traffic. In this configuration, interfaces 210*a* and 210*b* may be referred to as "line interfaces." However, interfaces 210*a* and 210*b* need not be line interfaces, and instead may receive and transmit non-multiplexed or demultiplexed network traffic (sometimes referred to as "intraoffice" or "low-speed" traffic, which typically include lower-speed communications, such as 10 G or 40 G).

Multiplexers 201 and 202 are interconnected by interconnection 203. In example embodiments herein, interconnection 203 is a high-speed (e.g., 100 G) electrical connection between the two multiplexers. Network traffic can be routed between the multiplexers via this interconnection. Thus, by virtue of interconnection 203, network traffic received at one of the interfaces 210*a* and 210*b* can be transmitted to the other interface. In an example embodiment herein, interconnection 203 is a link (e.g., a backplane or fiber interconnection) connected to packet interfaces (e.g., Interlaken interfaces) at each of the multiplexers 201 and 202. In another example embodiment herein, interconnection is a TDM link connecting multiplexers 201 and 202.

Interconnection 203 supports the pass-through configuration of network element 200 by permitting network traffic (e.g., OTU4 signals) received at one interface (210*a* or 210*b*) to be transmitted through interconnection 203 to the other interface (210*b* or 210*a*), and vice versa. For example, where network element 200 is on a 100 G ring and interconnection 203 is a 100 G connection, the interconnection allows the "passing through" of ring traffic between the multiplexers at full network speed.

Although not illustrated in FIG. 2, network element 200 (including multiplexers 201 and 202 (and/or other components of network element 200) each can include one or more additional interfaces through which multiplexers 201 and 202 can send and receive network traffic separate from the pass-through ring traffic. These interfaces may be configured on the "high-speed" (e.g., multiplexed) side of multiplexers 201 and 202 and/or on the "low-speed" (e.g., demultiplexed) side. Each additional interface may be optical or electrical, and may operate at 100 G, or at higher or lower speeds.

Additional interfaces of network element 200 can include 10 G interfaces (e.g., T-interfaces and SFP+ interfaces for OTU2, 10 GBaseX, or OC192 signals) and 40 G interfaces (e.g., QSFP+ interfaces for 40 GBaseX, OTU3, and OC768 signals).

Network element 200 thus can be configured (although is not shown in FIG. 2 as being configured) to handle network traffic other than pass-through ring traffic (e.g., egress or ingress network traffic). For example, through the additional interfaces, network traffic can be added to or removed from OTU ring traffic passing through network element 200. In other words, network element 200 can be configured to have add-drop functionality in addition to the pass-through functionality shown in FIG. 2. Those having skill in the relevant art will recognize in view of this description that when network element 200 is configured with one or more such additional interfaces, multiplexers 201 and 202 can each be regarded as an add/drop multiplexer (ADM). Configurations of network elements having add-drop functionality in addition to pass-through functionality are discussed below in connection with FIGS. 3 through 5.

Figure 3:
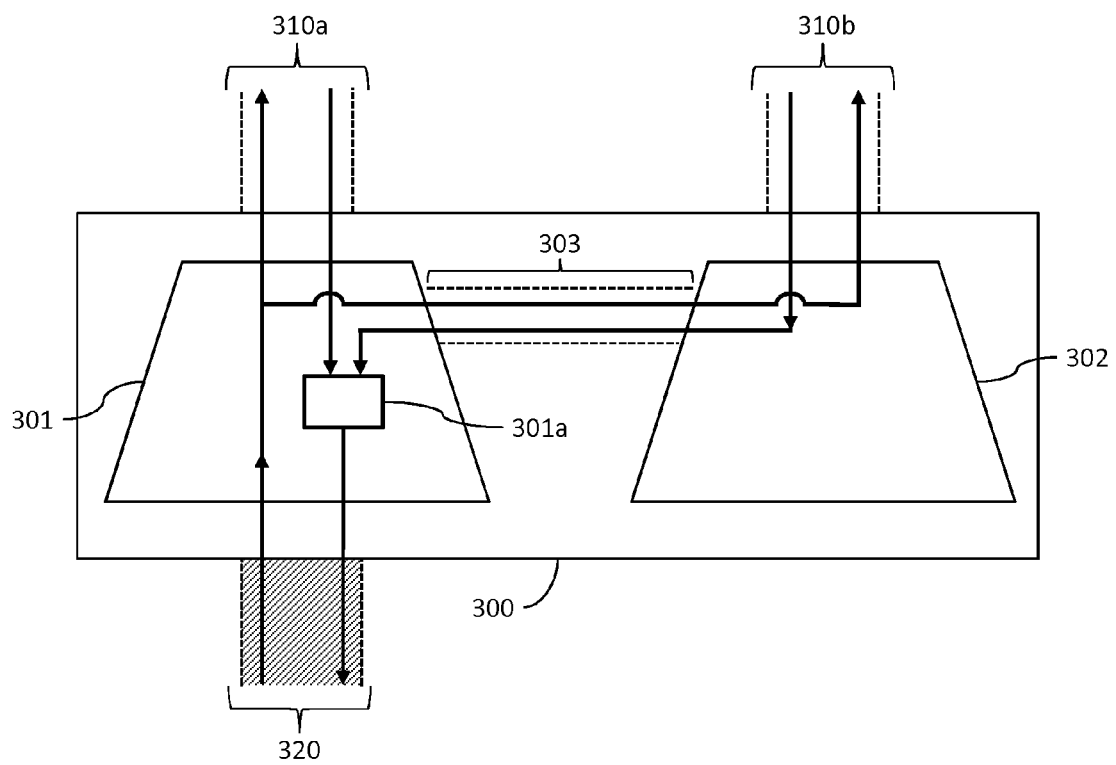
FIG. 3 shows a network element having an unprotected ingress configuration.

FIG. 3 shows a network element 300 in a configuration in which network traffic entering a ring is "unprotected." A network element configured as shown in FIG. 3 may be usable as a network element in (or forming a part of) a node in an optical ring network.

Network element 300 contains some components that are similar to those of network element 200. For example, network element 300 includes multiplexers 301 and 302, interfaces 310a and 310b, and interconnection 303. These components may operate or be configured to operate in a manner similar to the components described in connection with network element 200. Although not illustrated in FIG. 3, network element 300 can be configured to pass-through certain ring traffic.

Network element 300 further includes interface 320. Interface 320, which may be, for example, an OTU interface, carries add-drop traffic (e.g., ingress and egress network traffic that is entering and exiting a ring), and is separate from interfaces 310a and 310b through which ring traffic travels. In an example embodiment herein, interface 320 includes one or more interfaces through which one or more client sources or other "tributaries" (e.g., ISPs, client facilities, and/or other local sources) can be communicatively connected to network element 300 and, in turn, to a ring network. In this embodiment, ingress and egress network traffic can be received and transmitted, respectively, through interface 320.

As illustrated by arrows in FIG. 3, interface 320 can receive ingress traffic and transmit egress traffic. Ingress traffic (e.g., 10 G, 40 G, and/or 100 G traffic from one or more sources off of a ring network to which network element 300 is connected) is received through interface 320 and passed to both multiplexer 301 and multiplexer 302 (via interconnection 303), for multiplexing and transmission in each direction of the ring. Egress traffic (e.g., network traffic exiting the ring for sending to off-ring network elements, nodes, networks and/or other destinations) is demultiplexed by multiplexer 301 or 302 and transmitted through interface 320.

In the configuration shown in FIG. 3, egress traffic exiting the ring is protected. Specifically, network element 300 is configured to select between egress traffic that has been demultiplexed and removed from either of the redundant directions of the ring traffic received at the network element. This configuration is illustrated by the inbound arrows passing through interfaces 310a and 310b. Egress traffic in one ring direction is received through interface 310a, demultiplexed by multiplexer 301, and sent to an output selector 301a; egress traffic in the other ring direction is received through interface 310b, demultiplexed by multiplexer 302, and also sent to output selector 301a. The output selector is configured to select between one of these two redundant sources of egress traffic, for transmission through interface 320. In this manner, egress traffic can be protected.

In example embodiments herein, output selector 301a is configured, based on provisioning by a user and/or by a network management solution (e.g., management software operated on a network), to select between the two sources, for output to interface 320. When both sources are received by the output selector (e.g., under normal network conditions where no network interruptions exist) the selection by the output selector is based on, for example, the signal strength of the sources. For example, if the signal strength from one source is degraded relative to (e.g., has a bit error rate ten times worse than) the signal strength of the other source, the output selector can select the other source for output to interface 320.

In an example embodiment herein, selection by the output selector 301a follows a protocol for subnetwork (SNC) protection (e.g., SNC/I or SNC/N), as defined by ITU-T Recommendation G.841 ("Types and characteristics of SDH network protection architectures"). In another example embodiment herein, selection by the output selector 301a is based on one or more physical layer or "Layer 1" criteria such as the magnitude of optical signals or the presence (or absence) thereof.

On the other hand, when only one source provides egress traffic to output selector 301a (e.g., when a network failure occurs on the ring containing network element 300 such that network traffic is not received on interface 310a or 310b), the output selector 301a can select the only source (e.g. the interface 310a or 310b that is receiving network traffic) for output to interface 320. An example of only one source providing egress traffic is when an upstream network element or link on the ring has failed. In this example, typically a network element will detect the failure (using a framer chip, for example) and generate a maintenance message (e.g., an alarm indication signal) containing a notification of the failure. The maintenance message can be transmitted to the output selector 301a. The output selector can receive the maintenance message and select the source that is currently providing egress traffic.

Furthermore, in example embodiments herein, the output selector 301a further can detect the network failure by the absence of the other input. As an example, only one source may provide egress traffic to the output selector 301a when an interruption causes ring traffic to cease on one of the interfaces 310a and 310b. In this example, output selector 301a can detect (using, for example, the hardware thereof) that only one input was received and perform a switching operation to select the received input. In an example embodiment herein, after detecting that only one input was received, the output selector 300 further can perform one or more maintenance operations (e.g., sending one or more messages to downstream network element(s) and/or nodes on the ring).

Output selector 301a includes hardware (e.g., one or more optical switches), as well as software and/or firmware for configuring and controlling the hardware. The software and/or firmware of output selector 301a allows a user and/or or network management solution to configure the output selector (e.g., by provisioning the data units such as ODU0, ODU1, and/or ODU2 of the traffic passed to the interface 320). For example, software of output selector 301a can configure its associated hardware when the output selector switches from one source to another.

In the example embodiment herein as illustrated in FIG. 3, output selector 301a is a component of multiplexer 301. However, in other example embodiments herein, output selector 301a can be a component of multiplexer 302 (and network element 300 can be configured accordingly) or a wholly separate component of network element 300.

Although egress traffic can be protected in the configuration of network element 300, the configuration is "unprotected" for ingress traffic because there is only one facility for ingress traffic. In other words, on the low-speed side of the network element there is a single facility (e.g., a single input path) of ingress traffic for providing onto the ring. Were that facility disrupted, there would be no other path from which network element 300 could receive low-speed side network traffic. Thus, network element 300 can provide egress ring traffic to the interface 320 from one of two high-speed side sources (e.g., ring traffic from either interface 310*a* or incoming traffic from interface 310*b*), but can only provide unprotected ingress traffic from a single source facility. Protected ingress traffic requires a configuration other than the one shown in FIG. 3.

Figure 4:
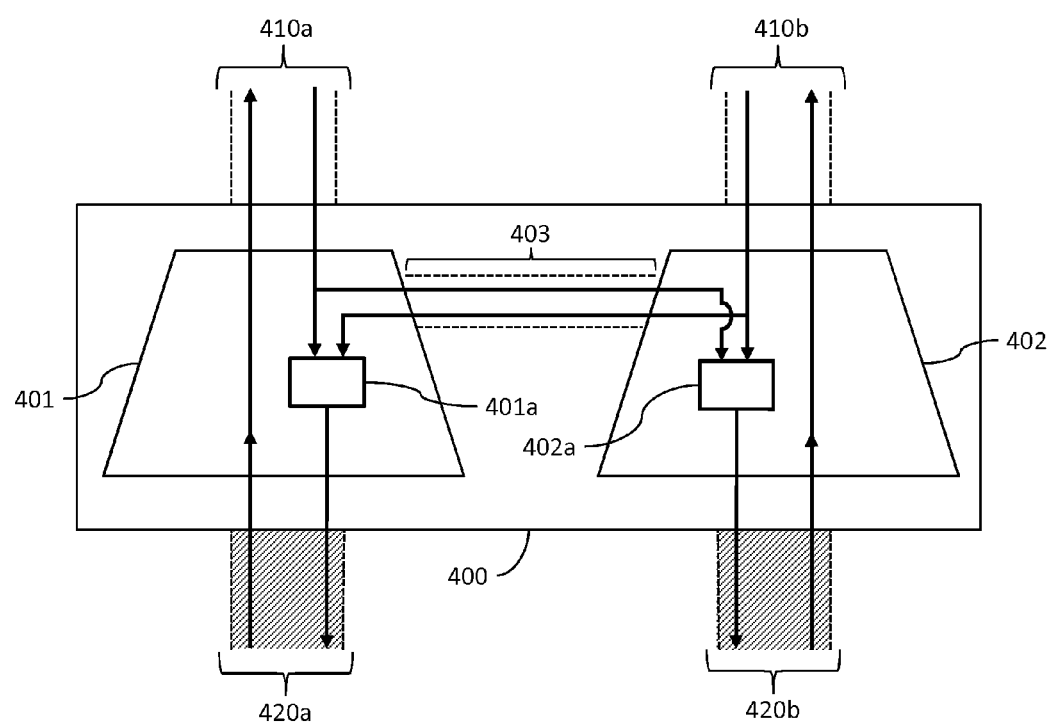
FIG. 4 shows a network element having a protected ingress configuration.

FIG. 4 shows an example configuration of a network element 400 that can provide protected ingress traffic (e.g., traffic selected from among two low-speed side facilities) to be multiplexed into ring traffic. Network element 400 also is configured to provide protected egress traffic.

Network element 400 includes several elements corresponding to those of network element 300: two interfaces 410*a* and 410*b* connected to two multiplexers 401 and 402, which in turn are connected by interconnection 403, such that the network element can provide egress traffic from either interface 410*a* or 410*b*. Network element 400 further includes two other interfaces 420*a* and 420*b* and two corresponding output selectors 401*a* and 402*a*. These two interfaces and output selectors can have functionality similarity to interface 320*a* and output selector 301*a*, respectively, described above in connection with FIG. 3. Furthermore, although not illustrated in FIG. 4, network element 400 can be configured to pass-through certain ring traffic (e.g., one or more network channels).

Each output selector of network element 400 can be configured to select between egress traffic demultiplexed from either incoming ring traffic at interface 410*a* or incoming ring traffic at interface 410*b*, as illustrated by the arrows to the output selectors. Accordingly, each interface 420*a* and 420*b* can be provided with egress traffic from one of two sources. Moreover, the two interfaces 420*a* and 420*b* each receive external network traffic that is multiplexed by a respective multiplexer 401 or 402 and transmitted onto the ring, in opposite directions. The ring thus is protected from ingress traffic disruptions. For example, if ingress traffic is interrupted at interface 420*a*, network element 400 (and, by extension, the ring to which network element 400 is connected) nevertheless can receive ingress traffic through the other interface 420*b*.

Figure 5:
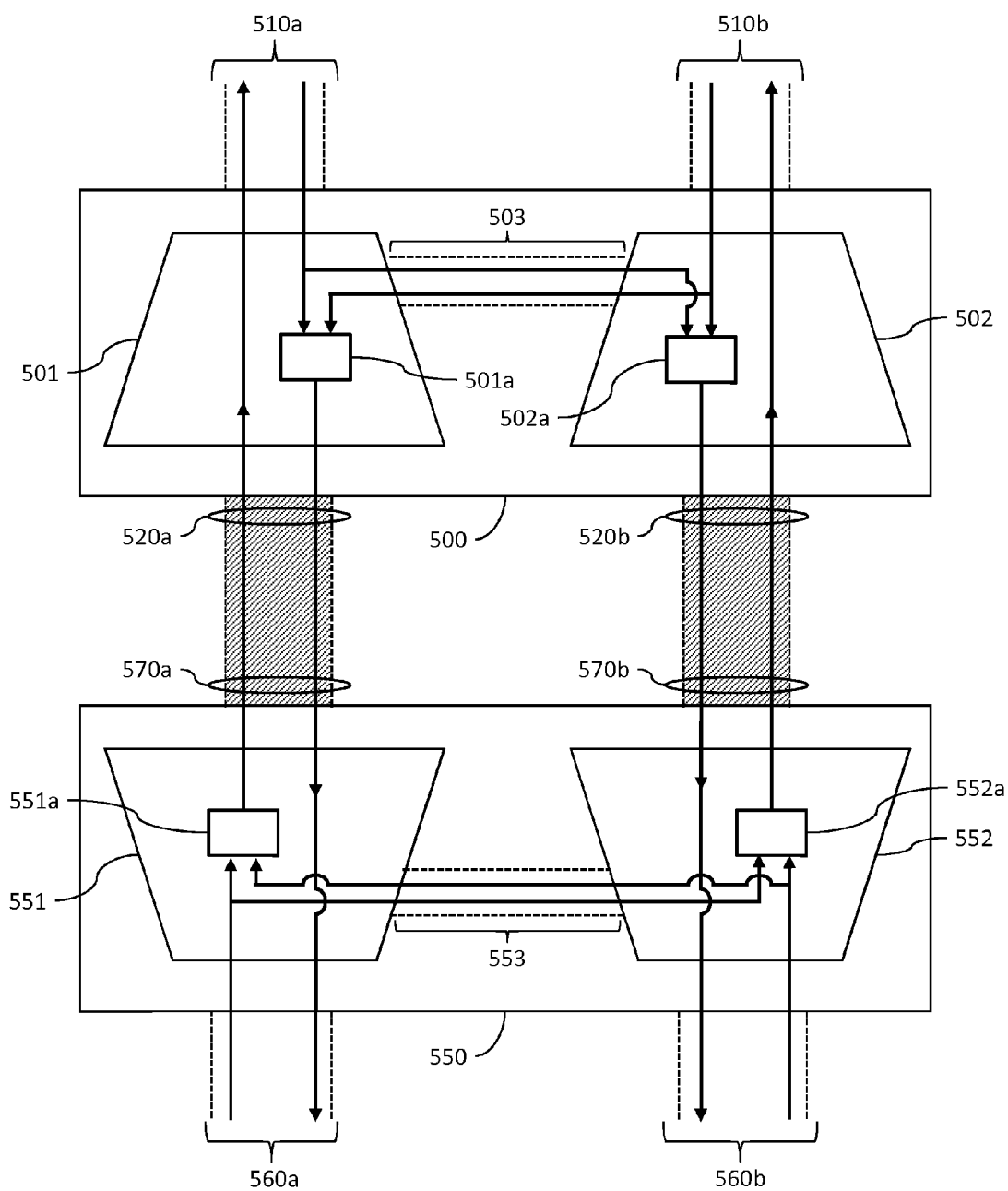
FIG. 5 shows two connected network elements, each having a protected ingress configuration.

FIG. 5 shows an example configuration of two redundantly-connected network elements 500 and 550. Each network element 500 and 550 has a protected egress and ingress configuration. The components of network elements 500 and 550 can have the same (or similar) functions as like-numbered (or, in the case of network element 550, like-numbered less 50) components of network element 400. Although not illustrated in FIG. 5, network elements 500 and 550 each can be configured to pass-through certain ring traffic (e.g., one or more network channels).

Network element 500 includes multiplexers 501 and 502 connected by interconnection 503. Ring traffic passes to multiplexer 501 (or 502) through interface 510*a* (or 510*b*) and is demultiplexed by the multiplexer 501 (or 502). The demultiplexed egress traffic then is sent to both the multiplexer's output selector 501*a* or 502*a* and also sent (over interconnection 503) to the other multiplexer's output selector 502*a* or 501*a*. At each output selector 501*a* or 502*a*, the selected egress traffic is transmitted through interface 520*a* or 520*b* to interface 570*a* or 570*b* of network element 550. On the other hand, ingress traffic sent from interfaces 570*a* and 570*b* of network element 550 are transmitted to multiplexers 501 and 502 via interfaces 520*a* and 520*b*, respectively. At each multiplexer, the ingress traffic is multiplexed and sent, as multiplexed ring traffic, through interface 510*a* or 510*b* onto the ring.

Similarly, network element 550 includes multiplexers 551 and 552, output selectors 551*a* and 552*a*, interconnection 553, interfaces 560*a* and 560*b*, and interfaces 570*a* and 570*b*. Network element 550 receives ingress traffic from network element 500's interfaces 520*a* and 520*b* at interfaces 570*a* and 570*b*, respectively. That traffic is then passed to multiplexers 551 and 552, multiplexed, and transmitted through interfaces 560*a* and 560*b*, respectively.

By virtue of the configuration of network elements 500 and 550, from the perspective of either network element, ingress traffic is dual-transmitted into the network element and thus does not require bandwidth on the interconnection of that network element. On the other hand, egress traffic from the ring uses the interconnection and output selectors of the network element to provide dual-transmitted egress traffic. Accordingly, reliability of the ingress network traffic can be improved while still maintaining a single interconnection within each network element.

Figure 6:
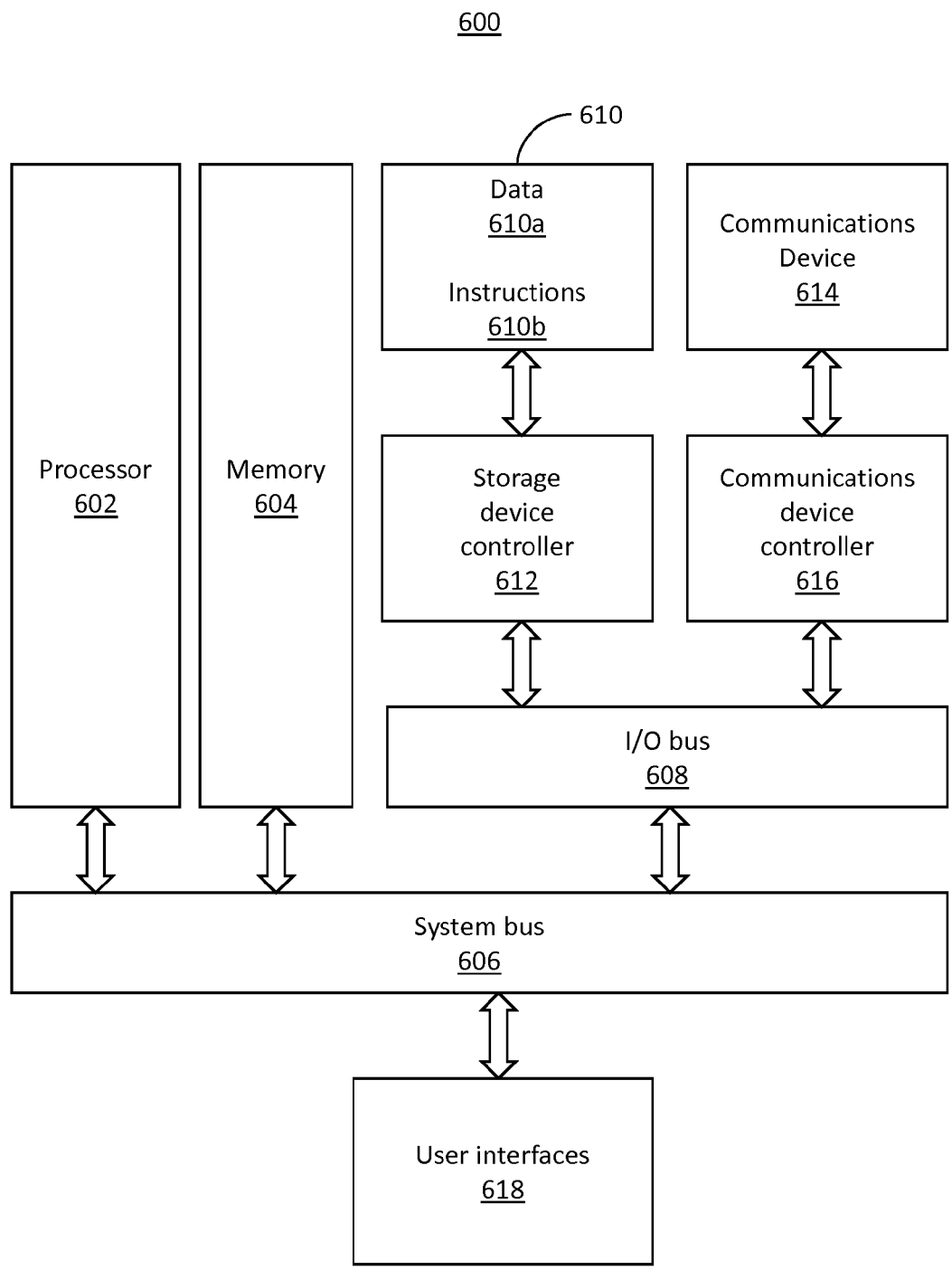
FIG. 6 is a diagram of an example data processing system.

FIG. 6 is a diagram of an example data processing system which, according to various example embodiments herein, can form, be incorporated in, or be a part of, for example, any component associated with the network 100 of FIG. 1 (e.g., nodes 111, 112, 113, and 114, and/or any component thereof) or described in the context of the network elements shown in any of FIGS. 2-5. Data processing system 600 includes a processor 602 coupled to a memory 604 via a system bus 606. Processor 602 may be employed in the performance of any example embodiment herein, and any functionality described herein may be effected using a computer program having program instructions 610*b* stored in a storage device 610. The processor 602 is also coupled to external devices (not shown) via the system bus 606 and an input/output (I/O) bus 608, and at least one user interface 618. The processor 602 may be further coupled to a communications device 614 via a communications device controller 616 coupled to the I/O bus 608. The processor 602 uses the communications device 614 to communicate with a network such as, for example, optical network 100, and the communications device 614 may have one or more I/O ports. Processor 602 also can include an internal clock (not shown in FIG. 6) to keep track of time and periodic time intervals. The user interface 618 may include, for example, at least one of a keyboard, mouse, trackball, touch screen, keypad, or any other suitable user-operable input device, and at least one of a video display, speaker, printer, or any other suitable output device enabling a user to receive outputted information.

A storage device 610 having a computer-readable medium is coupled to the processor 602 via a storage device controller 612, the I/O bus 608 and the system bus 606. The storage device 610 is used by the processor 602 and storage device controller 612 to read and write data 610*a*, and to store program instructions 610*b*. Alternately, program instructions 610*b* can be stored directly in non-volatile or volatile portions of memory 604. Program instructions 610*b* can be used to implement, for example, procedures described in connection with FIGS. 3, 4, and 5.

The storage device 610 can also store various routines and operating systems, such as Microsoft Windows, UNIX, and LINUX, or the like, that can be used by the processor 602 for controlling the operation of system 600. At least one of the operating systems stored in storage device 610 can include the TCP/IP protocol stack for implementing a known procedure for connecting to the Internet or another network, and can also include web browser software for enabling a user of the system 600 to navigate or otherwise exchange information with the World Wide Web.

In operation, the processor 602 loads the program instructions 610b from the storage device 610 into the memory 604. The processor 602 then executes the loaded program instructions 610b to perform at least part of the example procedures described herein.

By virtue of the example embodiments described herein, reliability of ingress and egress traffic at a network element can be improved.

In the foregoing description, example aspects of the present invention are described with reference to specific example embodiments herein. Despite these specific embodiments, many additional modifications and variations would be apparent to those skilled in the art. Thus, it is to be understood that example embodiments herein may be practiced in a manner otherwise than as specifically described. For example, although one or more example embodiments herein may have been described in the context of network elements having two add-drop multiplexers coupled by a line interconnection, it should be understood that the invention is not so limited, and that in practice the example embodiments herein may be employed in network elements having other components and configurations. As another example, although various network connections (e.g., interconnections 203, 303, 403, 503, and 553, ring fiber connections, and other connections between network elements and/or external sources) and network elements may have been described has incorporating specific networking standards (e.g., 100 G), it will be readily understood that, in practice, other networking standards, such as 10 G, 40 G, 100 G, 400 G, and 1T, may be used in any suitable combination. Accordingly, the specification is to be regarded in an illustrative rather than restrictive fashion. It will be evident that modifications and changes may be made thereto without departing from the broader spirit and scope.

Similarly, it should be understood that the figures are presented solely for example purposes. The architecture of the example embodiments presented herein is sufficiently flexible and configurable such that it may be practiced (and navigated) in ways other than that shown in the accompanying figures.

Software embodiments of the example embodiments presented herein may be provided as a computer program product, or software, that may include an article of manufacture on a machine-accessible, machine-readable, or computer-readable medium having instructions. The instructions on the machine-accessible, machine-readable, or computer-readable medium may be used to program a computer system or other electronic device. The machine-readable or computer-readable medium may include, but is not limited to, floppy diskettes, optical disks, CD-ROMs, and magneto-optical disks or other type of media suitable for storing or transmitting electronic instructions. The techniques described herein are not limited to any particular software configuration. They may find applicability in any computing or processing environment. As used herein, the terms "machine-accessible medium," "machine-readable medium," or "computer-readable" shall include any medium capable of storing, encoding, or transmitting an instruction or sequence of instructions for execution by the machine such that the machine performs any one or more of the procedures described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Furthermore, the purpose of the foregoing abstract is to enable the U.S. Patent and Trademark Office, the general public, and scientists, engineers, and practitioners in the art who are unfamiliar with patent or legal terms or phrases, to quickly determine from a cursory inspection the nature and essence of the technical disclosure of the application. The abstract is not intended to limit the scope of the present invention in any way. It is also to be understood that the processes recited in the claims need not be performed in the order presented.

What is claimed is:

1. A network element comprising:
   a first multiplexer communicatively coupled to a second multiplexer;
   an interconnection configured to communicatively couple the first multiplexer and the second multiplexer, wherein the first multiplexer transmits signals to the second multiplexer via the interconnection;
   a first interface communicatively coupled to the first multiplexer, the first interface configured to receive multiplexed signals;
   a second interface communicatively coupled to the second multiplexer, the second interface configured to receive multiplexed signals;
   a first selecting unit communicatively coupled to the first and second multiplexers, the first selecting unit configured to select between a signal received from the first multiplexer and a signal received from the second multiplexer; and
   a second selecting unit communicatively coupled to the first and second multiplexers, the second selecting unit configured to select between a signal received from the first multiplexer and a signal received from the second multiplexer.

2. A network element according to claim 1, the first multiplexer transmits signals to the second multiplexer and receives signals from the second multiplexer via the interconnection.

3. A network element according to claim 2, further comprising:
   a third interface communicatively coupled to the first selecting unit; and
   a fourth interface communicatively coupled to the second selecting unit.

4. A network element according to claim 3, wherein the first interface, the second interface, and the interconnection are each configured to support 100 Gigabit Ethernet communications.

5. A network element according to claim 4, wherein the third interface and the fourth interface are each configured to support at least one of 10 Gigabit Ethernet communications, 40 Gigabit Ethernet communications, and 100 Gigabit Ethernet communications.

6. A network element according to claim 5, wherein the interconnection includes at least one Interlaken interface.

7. A network element according to claim 6, further comprising:
   a data processing system configured to control at least the first selecting unit and the second selecting unit.

8. A network element comprising:
   at least two interfaces including a first interface and a second interface, wherein the network element is configured to transmit data received at the first interface out of the second interface;

at least two other interfaces; and at least two selecting units, wherein the network element is configured to receive first network communications at the first interface and second network communications at the second interface, wherein the network element is further configured to demultiplex the first network communications and the second network communications, wherein the network element is further configured to transmit the demultiplexed first network communications and the demultiplexed second network communications to the at least two selecting units, wherein the network element is further configured to, at each of the at least two selecting units, select one of the demultiplexed first network communications and the demultiplexed second network communications, and wherein the network element is further configured to transmit the demultiplexed network communications selected by each of the at least two selecting units to a separate one of the at least two other interfaces.

9. A network element according to claim 8, wherein the network element is further configured to receive demultiplexed client communications at the one of the at least two other interfaces and another of the at least two other interfaces, multiplex the demultiplexed client communications, and transmit the multiplexed client communications to the first interface and the second interface.

10. A network element according to claim 9, wherein the first interface and the second interface are each configured to support 100 Gigabit Ethernet communications.

11. A network element according to claim 10, wherein the one of the at least two other interfaces and the another of the at least two other interfaces are each configured to support at least one of 10 Gigabit Ethernet communications, 40 Gigabit Ethernet communications, and 100 Gigabit Ethernet communications.

12. A system comprising:
a network element, including:
at least two interfaces including a first interface and a second interface, wherein the network element is configured to transmit data received at the first interface out of the second interface,
at least two other interfaces, and
at least two selecting units; and
a data processing system communicatively coupled to the network element,
wherein the network element is configured to receive first network communications at the first interface and second network communications at the second interface,
wherein the network element is further configured to demultiplex the first network communications and the second network communications,
wherein the network element is further configured to transmit the demultiplexed first network communications and the demultiplexed second network communications to the at least two selecting units,
wherein the network element is further configured to, at each of the at least two selecting units, select one of the demultiplexed first network communications and the demultiplexed second network communications,
wherein the network element is further configured to transmit the demultiplexed network communications selected by each of the at least two selecting units to a separate one of the at least two other interfaces, and
wherein the data processing system includes at least one user interface.

13. A method for processing communications on a network comprising:
receiving, at a first interface, first multiplexed network communications;
receiving, at a second interface, second multiplexed network communications, wherein the second interface is configured to transmit data received at the first interface out of the second interface;
demultiplexing the first multiplexed network communications to obtain first demultiplexed data;
demultiplexing the second multiplexed network communications to obtain second demultiplexed data;
selecting, at a first selecting unit, one of the first and second demultiplexed data;
selecting, at a second selecting unit, one of the first and second demultiplexed data;
transmitting, to a third interface, the demultiplexed data selected by the first selecting unit; and
transmitting, to a fourth interface, the demultiplexed data selected by the second selecting unit.

14. A method according to claim 13, further comprising:
receiving, at the third interface, first client communications;
receiving, at the fourth interface, second client communications;
multiplexing the first client communications to obtain first multiplexed data;
multiplexing the second client communications to obtain second multiplexed data;
transmitting, at the first interface, the first multiplexed data; and
transmitting, at the second interface, the second multiplexed data.

15. A method according to claim 14, wherein the first and second interfaces are each configured to support 100 Gigabit Ethernet communications.

16. A method according to claim 15, wherein the third and fourth interfaces are each configured to support at least one of 10 Gigabit Ethernet communications, 40 Gigabit Ethernet communications, and 100 Gigabit Ethernet communications.

17. A method according to claim 13, wherein demultiplexing the first multiplexed network communications is performed by a first add-drop multiplexer, and demultiplexing the second multiplexed network communications is performed by a second add-drop multiplexer.

18. A method according to claim 17, wherein multiplexing the first client communications is performed by the first add-drop multiplexer, and multiplexing the second client communications is performed by the second add-drop multiplexer.

19. A method according to claim 18, wherein the first and second add-drop multiplexers are communicatively coupled by an interconnection.

20. A non-transitory computer-readable storage medium containing a computer program having instructions which, when executed by a computer, cause the computer to carry out a method for processing communications on a network, the method comprising:
demultiplexing first multiplexed network communications, received at a first interface, to obtain first demultiplexed data;
demultiplexing second multiplexed network communications, received at a second interface, to obtain second demultiplexed data, wherein data received at the first interface is configured to be transmitted out of the second interface;

selecting one of the first and second demultiplexed data by a first selecting unit;
selecting one of the first and second demultiplexed data by a second selecting unit;
transmitting the demultiplexed data selected by the first selecting unit; and
transmitting the demultiplexed data selected by the second selecting unit.

21. An add-drop network element comprising:
a first multiplexer communicatively coupled to a second multiplexer;
a first interface communicatively coupled to the first multiplexer, the first interface configured to receive multiplexed signals;
a second interface communicatively coupled to the second multiplexer, the second interface configured to receive multiplexed signals; and
a selector communicatively coupled to the first and second multiplexers, the selector configured to select between a signal received from the first multiplexer and a signal received from the second multiplexer, and output the selected signal to a third interface as egress network traffic,
wherein the first and second multiplexers are configured to receive, from the third interface, ingress network traffic, and
wherein the first and second interfaces are configured to transmit multiplexed signals that include the ingress network traffic.

* * * * *